United States Patent [19]

Hiraguchi

[11] Patent Number: 4,910,532
[45] Date of Patent: Mar. 20, 1990

[54] IMAGE RECORDING APPARATUS

[75] Inventor: Hiroshi Hiraguchi, Azuchi, Japan

[73] Assignee: Minolta Camera Kabushiki Kaisha, Osaka, Japan

[21] Appl. No.: 196,010

[22] Filed: May 19, 1988

[30] Foreign Application Priority Data

May 19, 1987 [JP] Japan .................................. 62-122879

[51] Int. Cl.⁴ ......................... G01D 15/14; H04N 1/21
[52] U.S. Cl. ...................................... 346/108; 358/296
[58] Field of Search ...................... 346/108, 160, 76 L; 358/296, 298, 285, 293

[56] References Cited

U.S. PATENT DOCUMENTS 4,750,010  6/1988  Ayers ................................. 358/298
4,768,043  8/1988  Saito .................................. 358/298

FOREIGN PATENT DOCUMENTS 59-188675  10/1984  Japan .
59-221165  12/1984  Japan .

Primary Examiner—Bruce A. Reynolds
Assistant Examiner—Mark Reinhart
Attorney, Agent, or Firm—Price, Gess & Ubell

[57] ABSTRACT

An image recording apparatus which is possible to change the rise on-time of a scanning beam controlled in an on-off manner by a data signal corresponding to image information to reproduce the white portion sufficiently and to obtain a high quality image.

11 Claims, 4 Drawing Sheets

IMAGE RECORDING APPARATUS

BACKGROUND OF THE INVENTION

1. Field of the Invention

This invention relates to an image recording apparatus which scans on a photosensitive drum a beam that is controlled, and off, by a data signal corresponding to predetermined image information. The beam records an image, and the inventor can change the on period of the data signal corresponding to the resolution.

2. Description of the Prior Art

A laser printer, as an image recording apparatus, is a recording apparatus in which a laser beam, deflected by a polygon mirror rotating at high speed, forms a latent image on a photosensitive drum by picture elements. The obtained latent image can be developed with a conventional electrophotographic process to form the visible image on copy paper. Since a high speed modulation of the laser beam is possible, a high speed and high quality (high density) printing and graphic recording can be realized.

The laser beam may be modulated by controlling a laser diode or the like, on-off by, a laser modulation pulse which is the data signal corresponding to the image data. When the image data is repeated on and off at every one dot, though the laser modulation pulse is also repeated on and off at every one dot, since the laser beam has some width (diameter) and is moving during the on period of the beam the portion exposed (black) by the laser beam is larger than that not exposed (white), thus the real image has a small white portion. Therefore, fine lines cannot be reproduced finely enough, or if the resolution is decreased for thinning the lines, the fine lines become blurred, and a half tone may be blackened.

Such a trend is more obvious when the resolution is made changeable or when recording, for example, the image of 400 dpi resolution by increasing the frequency of the dot clock while fixing the diameter of the laser beam at 240 dpi resolution, for example, larger than 400 dpi, because the dot distance becomes narrower.

In the past, as disclosed, for example, in Japanese Patent Application Laid-Open No. Sho 59-188675 (1984), it was known to bring the duty ratio of a pulse driving a beam generating means below 50 % to thicken the fine lines in the main scanning direction which is the scanning direction of the laser beam, and leaving the fine lines in the sub-scanning direction orthogonal thereto as it is for preventing the fine lines from becoming unclear. In such case, when the image data is continuously in an on state, there is the possibility that the laser modulation pulse will not become continuous, therefore it has been problematic to obtain the high quality image.

SUMMARY OF THE INVENTION

The present invention is devised to solve problems of the prior art described herein above, therefore it is an object of the present invention to provide an image recording apparatus in which the modulation start timing of the laser beam is delayed by certain predetermined period to shorten a width of a visible image to be formed corresponding to a plurality of picture elements in the image information, to thereby reproduce the white portion sufficiently, and thus a high quality image with clear fine lines can be obtained.

The above and further objects and features of the invention will more fully be apparent from the following detailed description with accompanying drawings.

DESCRIPTION OF THE PREFERRED EMBODIMENTS

Figure 1:
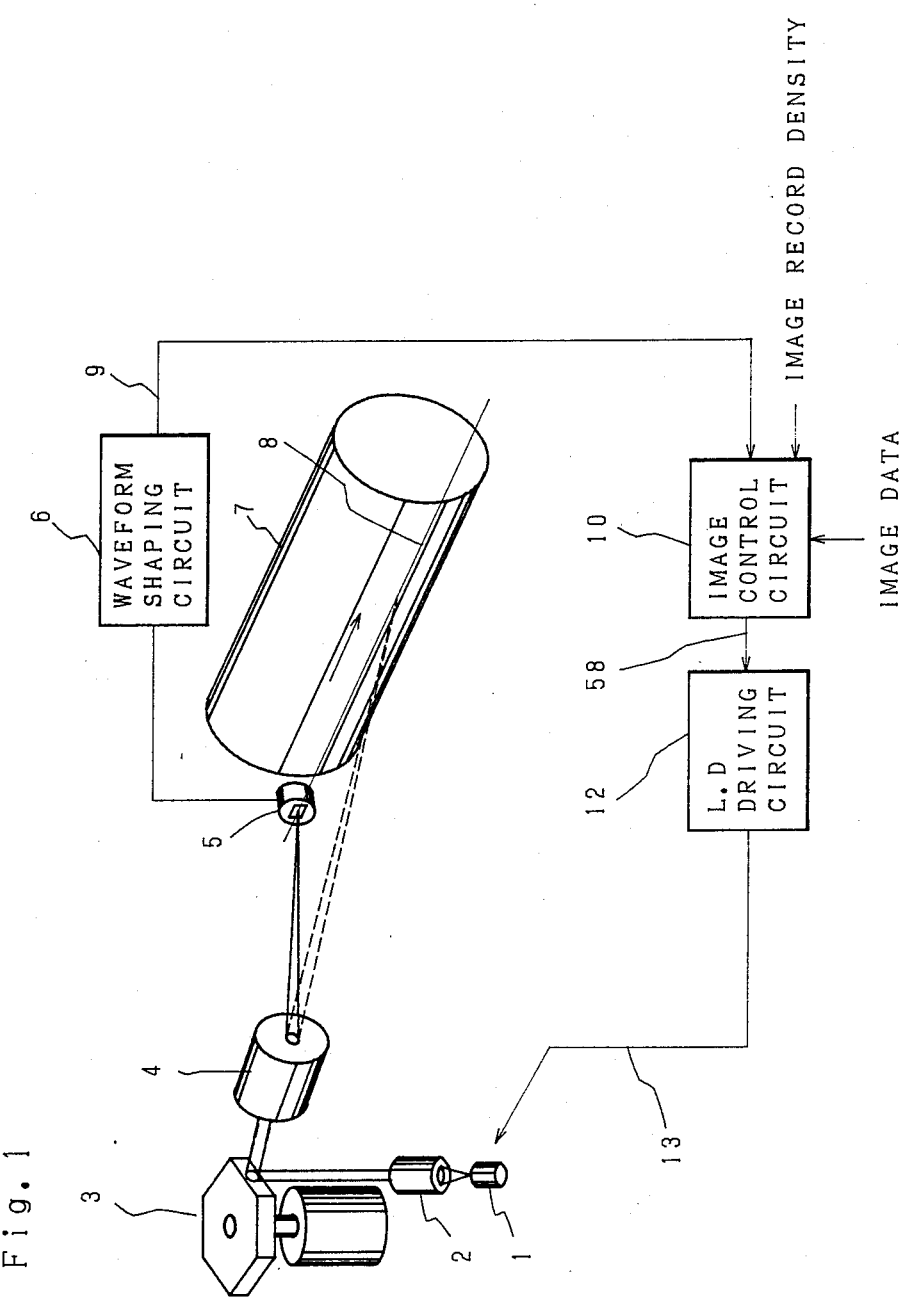
FIG. 1 is a diagram showing the configuration of a laser printer which is an image recording apparatus according to the present invention.

FIG. 1 is a diagram showing the configuration of a laser printer which is an image recording apparatus according to the present invention.

In FIG. 1, a laser diode 1 (hereinafter referred to as LD) is modulation-driven by an LD driving circuit 12 which will be described in the following. A collimator lens 2 is located at a position for receiving a laser beam which is a scanning beam from the LD1 to correct the expansion of the beam diameter. A polygon mirror 3 is located at a position for receiving the laser beam from the collimator lens 2. The polygon mirror 3 rotates so that the laser beam scans a photosensitive drum 7 which is an image forming body to obtain the beam scanning line 8. A fθ lens 4 is located at a position for receiving the laser beam from the polygon mirror 3 to correct the image distortion by allowing the laser beam to scan the photosensitive drum 7 at a constant speed. A beam detector 5 is provided adjacent to the photosensitive drum 7 to decide the character printing position in the main scanning direction. The photosensitive drum 7 is a cylindrical member located at a position for receiving the laser beam from the fθ lens 4. The beam scanning line 8, which is indicated for convenience, first passes through the beam detector 5 and then passes through the photosensitive drum 7 for scanning.

The LD driving circuit 12 outputs a LD driving signal 13 which is formed of a pulse train corresponding to the image data. The LD1 is switched by the LD driving signal 13 to emit a pulse-modulated laser beam. A waveform shaping circuit 6 receives a signal which is outputted when the laser beam passes through the beam detector 5, shapes the waveform of the signal and outputs a SSCAN signal 9. An image control circuit 10 receives the SSCAN signal 9, an image data for every line of the beam scanning line 8 as an LD data signal 58 to the aforementioned LD driving circuit 12.

A scanning beam generating means is constituted by the aforesaid LD1, collimator lens 2, polygon mirror 3 and fθ lens 4.

Figure 2:
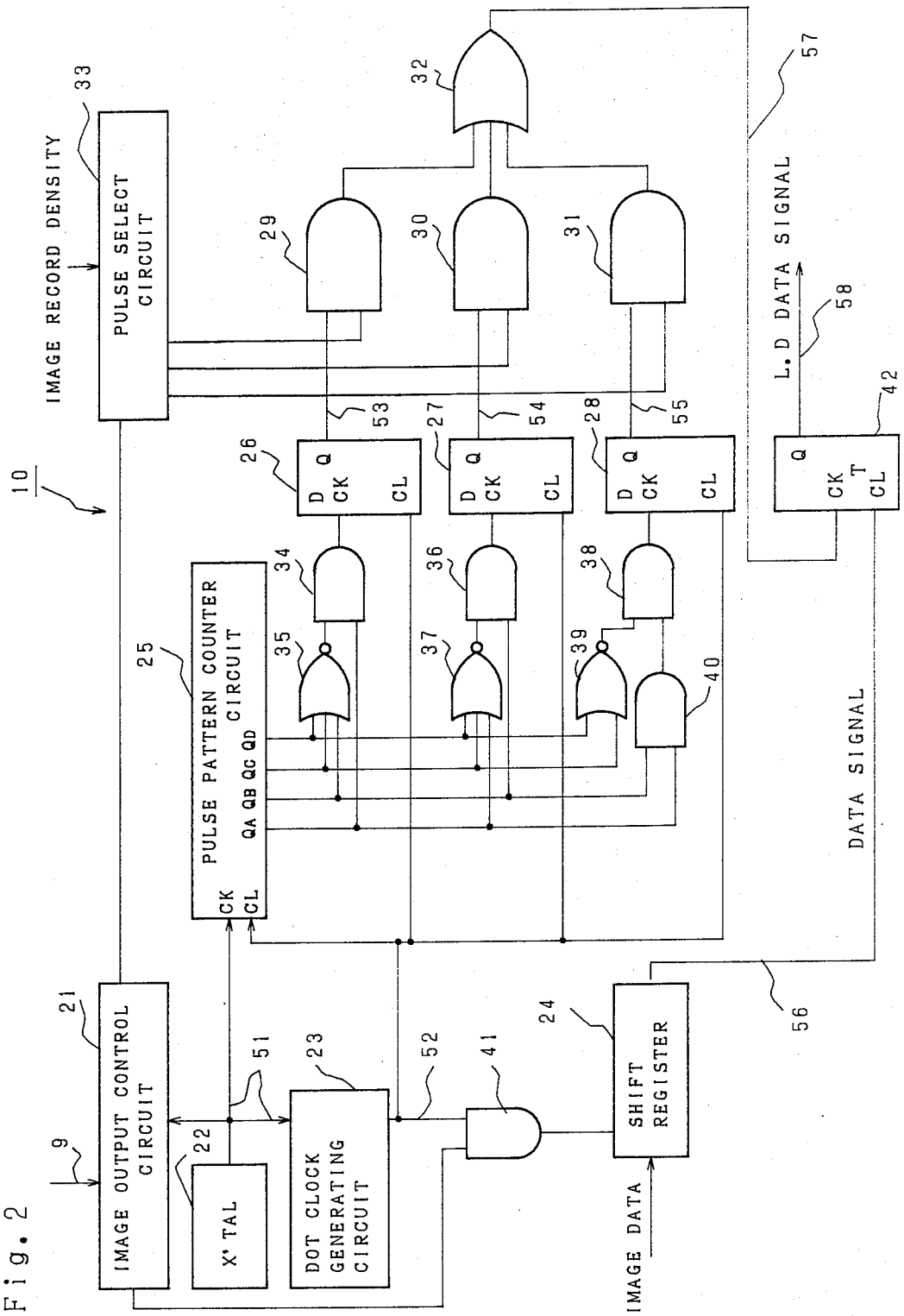
FIG. 2 is a block diagram of an image control circuit of a laser printer of the present invention.

FIG. 2 is a block diagram of an image control circuit 10 which is a part of the control circuit in a laser printer for obtaining a laser modulation pulse which is the data signal from the image data.

The image data sent from a character generator, not shown, and the like is loaded into a shift register 24 which is an image data buffer means and outputs the data signal 56. The data signal 56 is delayed for a predetermined period from a dot clock signal 52 which is a reference pulse signal obtained by means of the frequency division by using a dot clock generator 23, of an original oscillation clock signal 51 from an oscillator 22 using a quartz vibrator. An image output control circuit 21 includes a counter which is started in synchronism with the synchronizing signal (SSCAN signal 9) inputted in the beginning of every scanning of the laser beam. By the count value of this counter, a position of the laser beam on the light scanning line or the position in the main scanning direction on the photosensitive drum 7 is detected to decide the writing start position of the image and its image area width, and by this signal the dot clock signal 52 to the shift register 24 is restricted through an AND gate 41 so that the image data is not outputted outside the width of a recording paper.

A data signal generating means is constituted by the aforesaid image output control circuit 21, oscillator 22, dot clock generator 23, AND gate 41 and shift register 24.

A counter circuit for pulse pattern 25 counts the original oscillation clock signal 51 of the oscillator 22 and outputs signals QA, QB, QC and QD formed by means of the frequency division of the original oscillation clock signal 51 into half, quarter, one eighth and one sixteenth. These signals QA, QB, QC and QD are inputted to clock terminals of D flip-flops 26, 27, 28 through logic circuits comprising NOR elements 35, 37, 39 and AND elements 34, 36, 38, 40, delaying by 1 pulse, 2 pulses and 3 pulses of the original oscillation clock signal 51 respectively, thereby the D flip-flops 26, 27, 28 output the pulse signals 53, 54, 55 which rise as delaying by one pulse successively and fall simultaneously (refer to FIG. 3).

A pulse width selector circuit 33 receives information from the image output control circuit 21 and outputs a selective signal corresponding to the resolution ( e.g. 240 dpi, 300 dpi, 400 dpi) which is switched by a suitable switch means such as a dip switch to select either of the AND elements 29, 30, 31, which thereby selects either of the aforesaid pulse signals 53, 54, 55. As a resolution changing means, for example, the one disclosed in U.S. Patent Application Serial No. 114,250 "Printing Apparatus" filed on October 27, 1987 is used. A rise on-time changing means is constituted by the aforesaid counter circuit for pulse pattern 25, logic circuit, D flip-flops 26, 27, 28, pulse width selector circuit, AND elements 29, 30, 31 and OR element 32. To a flip-flop 42 which is an image control means, a data signal 56 outputted from the shift register 24 and the outputs of AND elements 29, 30, 31 through an OR element 32 are inputted thereby an LD data signal 58 is outputted.

Figure 3:
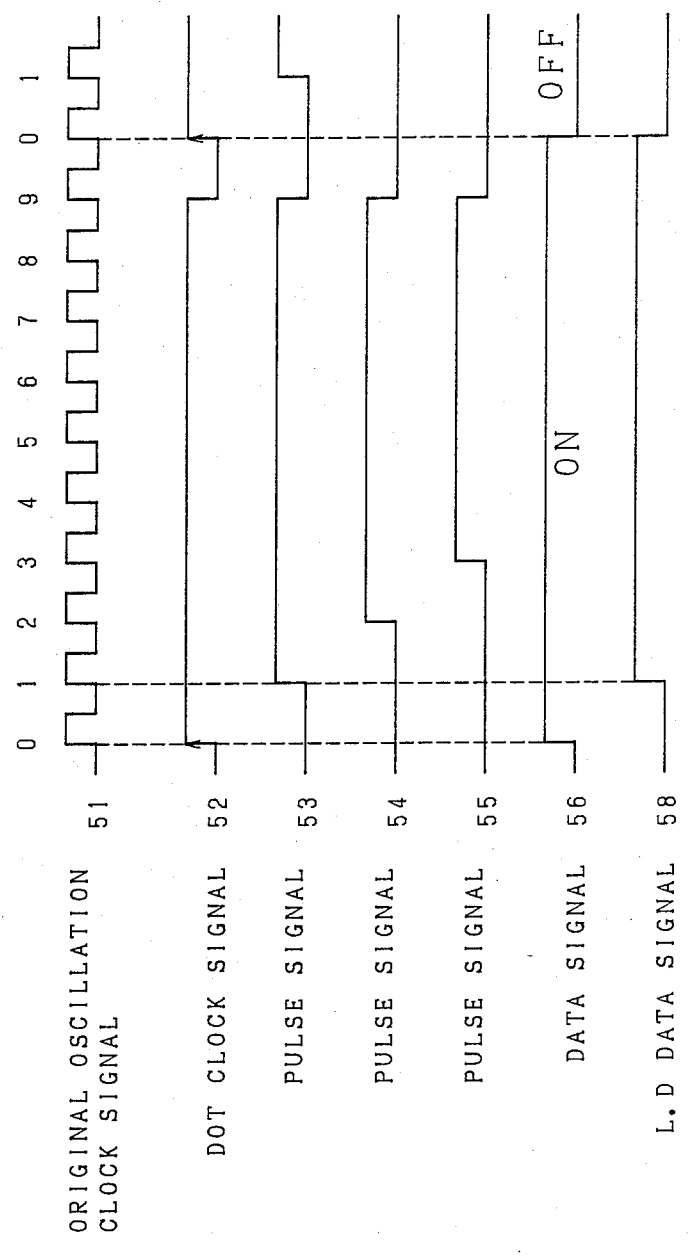
FIG. 3 is a time chart showing signal waveforms of various portions of an image control circuit of a laser printer of the present invention.

FIG. 3 is a time chart showing signal waveforms of various portions of an image control circuit 10.

The dot clock signal 52 is a pulse signal which rises at every 10 counts of the original oscillation clock signal 51 and falls at the 9th count from the rise for obtaining the output timing of the data signal 56 of the shift register 24 by utilizing the rise. The dot clock signal 52 is also used as a clear signal for the counter circuit for pulse pattern 25 and D flip-flops 26, 27, 28.

The pulse signals 53, 54, 55 from the D flip-flops 26, 27, 28 rise as delaying successively by one pulse of the original oscillation clock signal 51 as compared with the dot clock signal 52 and fall simultaneously as the dot clock signal 52.

Assuming here that the AND element 29 is selected by the pulse width selector circuit 33, when the data signal 56 which is on and off in synchronism with the rise of dot clock signal 52 is outputted from the shift register 24 in the state where the pulse signal 53 is inputted to the flip-flop 42, the LD data signal 58 is outputted form the flip-flop 42 as delaying by one pulse of the original oscillation clock signal 51 as compared with the data signal 56. When the other AND elements 30, 31 are selected by the pulse width selector circuit 33 and the pulse signal 53 or 54 is inputted to the flip-flop 42, the LD data signal rises as delaying by 2 or 3 pulses of the original oscillation clock signal 51 as compared with the data signal 56.

Thus, the on period of the LD data signal 58 becomes shorter than that of the data signal 56, thereby the emitting time of the laser diode is shortened to reduce the black portion and to increase the white portion accordingly. Corresponding to the resolution either one of the pulse signals 53, 54, 55 is selected, and thereby the black/white ratio is changed to reproduce the white portion sufficiently, thus the fine lines can be kept clear.

Figure 4:
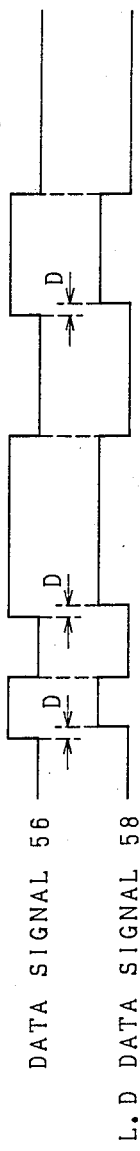
FIG. 4 is a time chart showing the relationship between a data signal and a laser diode data signal.

FIG. 4 shows the relationship between a data signal and LD data signal when an image data is on continuously by a plurality of dots. In FIG. 3, though the case in which the data signal 56 is on and off at every one dot or the image data is on and off repeatedly at every one dot is shown, as shown in FIG. 4, when the image data is on continuously by a plurality of dots or when the black portion is continued, the data signal 56 is continued by a plurality of dots and only the first one dot thereof is risen as delaying by one pulse or few pulses of the original oscillation clock signal 51. Thus, the off period of the LD data signal 58 is lengthened to reproduce the white portion sufficiently and continuously in the on state while the LD data signal 58 is on, therefore the black portion of the image is reproduced continuously and a high quality image can be obtained.

In the embodiment described herein above, though so-called an inversion developing method in which the photosensitive drum irradiated with a laser beam is developed to form an image embodying the present invention has been shown, the present invention may be utilized also in a method where the photosensitive drum onto which the laser beam is not irradiated is developed. In this case, the first one pulse or a few pulses of the off period of data signal 56 may be delayed corresponding to the resolution.

As described heretofore, according to the present invention, when the resolution is changed the white portion can be reproduced sufficiently and the fine lines are kept clear to obtain a high quality image.

As this imvention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An image recording apparatus comprising:
   a photosensitive member capable of forming a latent image of image information on its surface,
   a scanning beam generating means for generating a scanning beam as modulated in accordance with the image information, to thereby irradiate said photosensitive member,
   a data signal generating means for generating a data signal which provides an on and off transmission of said beam corresponding to said image information,
a rise on-time changing means for changing the rise on-time of said data signal, and
an image control means for controlling said scanning beam generating means by the data signal whose rise on-time is changed by said rise on-time changing means.

2. An image recording apparatus as set forth in claim 1 further comprising,
a resolution changing means for making the resolution of the latent image changeable, by making the on-off cycle of said scanning beam changeable, the rise on-time of said rise on-time changing means being changed corresponding to said resolution.

3. An image recording apparatus as set force in claim 1, wherein said data signal generating means comprises,
a reference pulse generating means for generating a reference pulse signal which decides a generating cycle of said data signal,
an image output control circuit having a counter which is started to count in synchronism with a synchronizing signal inputted at the beginning of each scanning of said scanning beam, and
an image data buffer means for storing said image information and for generating said data signal by said reference pulse signal restricted by said synchronizing signal.

4. An image recording apparatus as set forth in claim 3, wherein said rise on-time changing means comprises,
a pulse signal generating means for generating a plurality of pulse signals which are delayed relative to said reference pulse signal, and
a pulse signal selecting means for selecting one of the pulse signals out of said plurality of pulse signals.

5. An image recording apparatus as set forth in claim 4, wherein said image control means changes the rise on-time of said data signal corresponding to said selected pulse signal.

6. An image recording apparatus as set forth in claim 5 further comprising,
a resolution changing means for making the resolution of the latent image changeable, by making said reference pulse signal changeable, a plurality of pulse signals of said pulse signal selecting means being selected on the basis of said resolution.

7. A laser printer in which a laser beam is modulated to turn on and off in accordance with image information and the modulated beam is scanned on a photosensitive member to form a visible image comprising:
means for modulating the laser beam in accordance with the image information, and
means for delaying the start of a modulation timing by a predetermined time period to shorten a width of a visible image constituted by a succession of a plurality of picture elements included in the image information.

8. In an improved laser printer having a laser beam modulated to an on and off condition to form discrete picture elements of image information on a photosensitive member, the improvement comprising:
means for providing image information for modulating the laser beam;
means for setting a predetermined resolution characteristic, and
means for varying the modulation in accordance with the selected resolution characteristic to permit a sufficient reproduction of a white portion of the image information to increase image quality.

9. A laser printer in which a laser beam is modulated to turn on and off in accordance with image data signals and the modulated beam is scanned on a photosensitive member to form a visible image comprising:
means for generating a dot clock;
means for outputting the image data signals synchronously with the dot clock;
a rise on-time delaying means for delaying the first rise on-time of one or successive image data signals by a predetermined time period from the rise on-time of the dot clock corresponding to the first image data signal, and
means for modulating the laser beam in accordance with the image data signals whose rise on-time is delayed by said rise on-time delaying means.

10. A laser beam printer as set forth in Claim 9 further comprising:
means for selecting a resolution characteristic, and
means for varying the predetermined time period used in said rise on-time delaying means in accordance with the selected resolution characteristic.

11. A laser beam printer as set forth in claim 10 wherein said image data outputting means includes an image information memory means for storing an image information and outputting the image data signals according to the stored image information.

* * * * *